United States Patent
Ohyama et al.

(10) Patent No.: US 12,128,891 B2
(45) Date of Patent: Oct. 29, 2024

(54) CONTROL SYSTEM AND CONTROL METHOD

(71) Applicant: Panasonic Intellectual Property Management Co., Ltd., Osaka (JP)

(72) Inventors: Shinji Ohyama, Osaka (JP); Kazuma Takeuchi, Kyoto (JP); Beier Hu, Osaka (JP); Motoshi Anabuki, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 253 days.

(21) Appl. No.: 17/749,545

(22) Filed: May 20, 2022

(65) Prior Publication Data
US 2022/0274594 A1 Sep. 1, 2022

Related U.S. Application Data

(63) Continuation of application No. PCT/JP2021/002661, filed on Jan. 26, 2021.

(30) Foreign Application Priority Data

Feb. 27, 2020 (JP) .................. 2020-032328

(51) Int. Cl.
*B60W 30/095* (2012.01)
*G08G 1/16* (2006.01)

(52) U.S. Cl.
CPC ......... *B60W 30/0956* (2013.01); *G08G 1/166* (2013.01); *B60W 2552/05* (2020.02); *B60W 2552/45* (2020.02); *B60W 2554/4041* (2020.02)

(58) Field of Classification Search
None
See application file for complete search history.

(56) References Cited

U.S. PATENT DOCUMENTS

2010/0305858 A1* 12/2010 Richardson .............. G06N 7/02
  706/52
2017/0344007 A1* 11/2017 Song .................... G05D 1/0217
(Continued)

FOREIGN PATENT DOCUMENTS

| JP | 2012-173786 | 9/2012 |
| JP | 5617677 | 11/2014 |
| WO | 2019/167457 | 9/2019 |

OTHER PUBLICATIONS

International Search Report (ISR) issued on Apr. 20, 2021 in International (PCT) Application No. PCT/JP2021/002661.
(Continued)

*Primary Examiner* — Peter D Nolan
*Assistant Examiner* — Michael F Whalen
(74) *Attorney, Agent, or Firm* — Wenderoth, Lind & Ponack, L.L.P.

(57) ABSTRACT

A control system includes an obtainer that obtains sensing data output from a sensor that performs sensing of an outside of a mobile body, a detector that detects a position of an object outside the mobile body based on the sensing data, a movement predictor that predicts a movement of the object based on the sensing data, a costmap generator that generates a first costmap based on the position detected of the object and a second costmap based on the movement predicted of the object, a path generator that generates a path for the mobile body based on the first costmap, a determination generator that generates a movement determination of the mobile body based on the second costmap and the path generated, and a controller that controls the movement of the mobile body in accordance with the path generated and the movement determination.

14 Claims, 7 Drawing Sheets

(56) References Cited

U.S. PATENT DOCUMENTS

| | | |
|---|---|---|
| 2018/0339709 A1 | 11/2018 | Tiwari et al. |
| 2019/0204842 A1 | 7/2019 | Jafari Tafti et al. |
| 2021/0116930 A1* | 4/2021 | Ariki .................. G05B 13/0265 |
| 2021/0122364 A1* | 4/2021 | Lee ....................... G01S 7/4802 |
| 2021/0380106 A1* | 12/2021 | Chinni ................. G05D 1/0238 |

OTHER PUBLICATIONS

Xiaoning Han, et al., "A Novel Navigation Scheme in Dynamic Environment Using Layered Costmap", 2017 29th Chinese Control and Decision Conference (CCDC), May 2017, pp. 7123-7128.
Extended European search report issued Jul. 5, 2023 in corresponding European Patent Application No. 21759967.9.

* cited by examiner

CONTROL SYSTEM AND CONTROL METHOD

CROSS REFERENCE TO RELATED APPLICATIONS

This is a continuation application of PCT International Application No. PCT/JP2021/002661 filed on Jan. 26, 2021, designating the United States of America, which is based on and claims priority of Japanese Patent Application No. 2020-032328 filed on Feb. 27, 2020. The entire disclosures of the above-identified applications, including the specifications, drawings and claims are incorporated herein by reference in their entirety.

FIELD

The present disclosure relates to a control system and a control method for controlling the movement of a mobile body.

BACKGROUND

To date, there is disclosed a driving assistance device that can help a vehicle travel safely by predicting the movement of an object, such as an obstacle, present outside the vehicle and avoiding a collision with such an object outside the vehicle (for example, PTL 1).

Moreover, in one conceivable technique, a path for the vehicle is generated based on a costmap representing an object outside a vehicle as a cost so as to avoid a high cost region, and thus the vehicle can travel safely in accordance with the generated path (for example, NPL 1).

CITATION LIST

Patent Literature

PTL 1: Japanese Patent No. 5617677

Non Patent Literature

NPL 1: A novel navigation scheme in dynamic environment using layered costmap, https://ieeexplore.ieee.org/abstract/document/7978468

SUMMARY

Technical Problem

Despite the above, a path generated based on a costmap that takes the movement of an object into consideration may compromise the safety or the comfort of the movement of a mobile body, such as a vehicle.

Accordingly, the present disclosure provides a control system and so on that can help improve the safety or the comfort of the movement of a mobile body moving in accordance with a costmap.

Solution to Problem

A control system according to the present disclosure includes: an obtainer that obtains sensing data output from a sensor that performs sensing of an outside of a mobile body; a detector that detects a position of an object outside the mobile body based on the sensing data; a movement predictor that predicts a movement of the object based on the sensing data; a costmap generator that generates a first costmap based on the position detected of the object and a second costmap based on the movement predicted of the object; a path generator that generates a path for the mobile body based on the first costmap; a determination generator that generates a movement determination of the mobile body based on the second costmap and the path generated; and a controller that controls the movement of the mobile body in accordance with the path generated and the movement determination.

It is to be noted that general or specific aspects of the above may be implemented in the form of a system, a method, an integrated circuit, a computer program, or a computer readable recording medium, such as a CD-ROM, or through any desired combination of a system, a method, an integrated circuit, a computer program, and a recording medium.

Advantageous Effects

The control system and so on according to one aspect of the present disclosure can improve the safety or the comfort of the movement of a mobile body moving in accordance with a costmap.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS (Underlying Knowledge Forming Basis of the Present Disclosure)

First, with reference to FIG. 1A and FIG. 1B, some underlying knowledge forming a basis of one aspect of the present disclosure will be described.

Figure 1A:
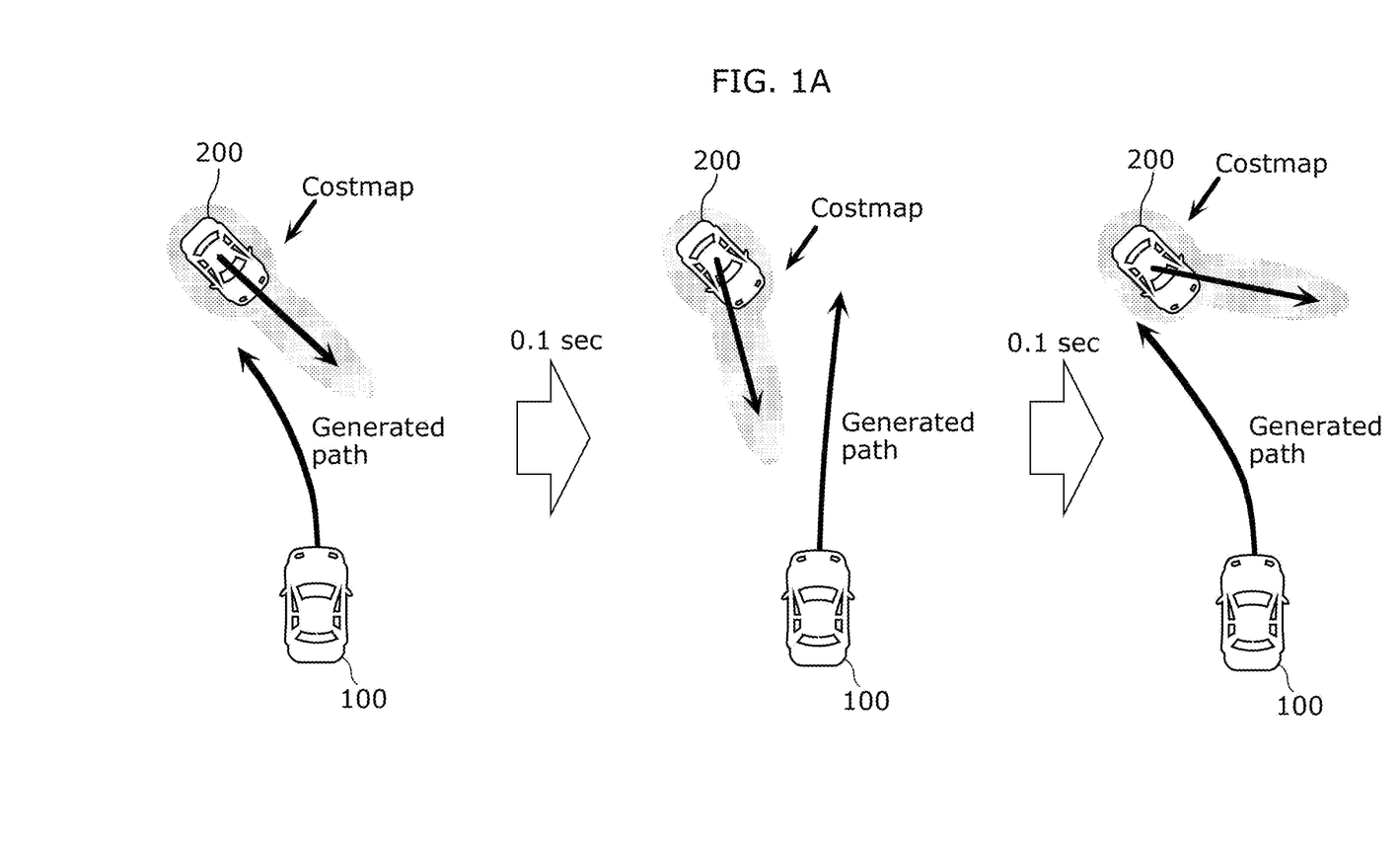
FIG. 1A is an illustration for describing a problem that may arise when a movement prediction of an object is reflected onto a costmap.
Figure 1B:
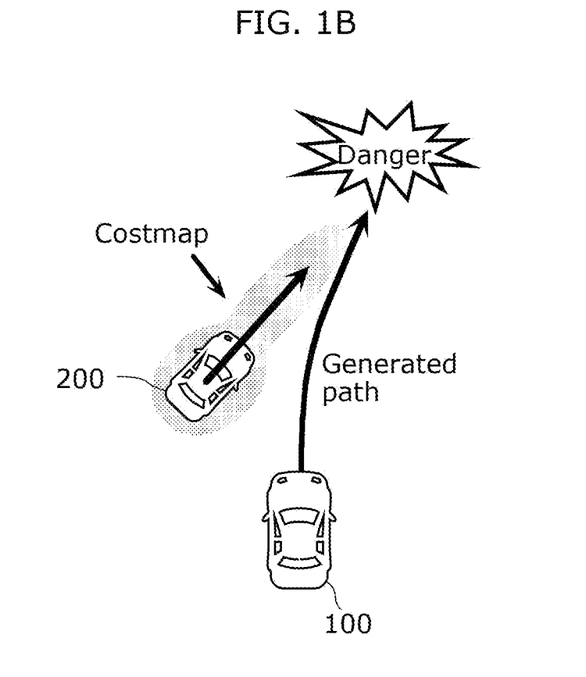
FIG. 1B is an illustration for describing another problem that may arise when a movement prediction of an object is reflected onto a costmap.

FIG. 1A and FIG. 1B are each an illustration for describing a problem that may arise when a movement prediction of an object is reflected onto a costmap.

As described above, costmaps mainly deal with static environments. When a costmap is to deal with a dynamic environment, in one conceivable case, a movement prediction of an object, such as an obstacle, outside a mobile body (for example, a vehicle) is reflected onto a costmap, and a path for that vehicle is generated accordingly. For example, in one conceivable case, a region located in the moving direction of an object may be assigned a high cost based on a predicted movement of the object, and a path may be generated for the vehicle so as to avoid the high cost region. When a movement prediction of an object is reflected onto a costmap, however, a problem may arise as will be described with reference to FIG. 1A and FIG. 1B.

In FIG. 1A, the time advances by, for example, 0.1 seconds each from the diagram on the left to the diagram in the middle and to the diagram on the right. At the time corresponding to the diagram on the left in FIG. 1A, a movement prediction of vehicle 200 indicates that vehicle 200 will move straight ahead, and this prediction result is reflected onto the costmap. Based on the costmap reflecting this prediction result, a path is generated to cause vehicle 100 to curve to the left relative to its traveling direction in order to avoid vehicle 200 moving straight ahead. However, movement predictions are not stable in reality. For example, although vehicle 200 is predicted to move straight ahead at the time corresponding to the diagram on the left in FIG. 1A, this vehicle 200 is predicted to curve to the right relative to its traveling direction at the time corresponding to the diagram in the middle indicating the prediction made 0.1 seconds thereafter. Therefore, at the time corresponding to the diagram in the middle in FIG. 1A, based on the costmap reflecting this new prediction result, a path is generated to cause vehicle 100 to curve to the right relative to its traveling direction in order to avoid vehicle 200 curving to the right relative to its traveling direction. Furthermore, for example, although vehicle 200 is predicted to curve to the right relative to its traveling direction at the time corresponding to the diagram in the middle in FIG. 1A, this vehicle 200 is predicted to curve to the left relative to its traveling direction at the time corresponding to the diagram on the right indicating the prediction made 0.1 seconds thereafter. Therefore, at the time corresponding to the diagram on the right in FIG. 1A, based on the costmap reflecting this new prediction result, a path is generated to cause vehicle 100 to curve to the left relative to its traveling direction in order to avoid vehicle 200 curving to the left relative to its traveling direction. In this manner, a path that fluctuates every moment is generated, and this causes vehicle 100 to meander rapidly. This behavior of vehicle 100 causes a problem in terms of the safety or the comfort of the traveling of vehicle 100.

Meanwhile, in FIG. 1B, vehicle 200 is predicted to move straight ahead, and this prediction result is reflected onto the costmap. Based on the costmap reflecting this prediction result, a path is generated to cause vehicle 100 to curve to the right relative to its traveling direction in order to avoid vehicle 200 moving straight ahead. Although it is safer if vehicle 100 stops in such a case, the generated path causes vehicle 100 to approach vehicle 200 while actively trying to avoid vehicle 200. This raises a problem in terms of the safety of the traveling of vehicle 100.

Accordingly, a control system according to one aspect of the present disclosure includes an obtainer, a detector, a movement predictor, a costmap generator, a path generator, a determination generator, and a controller. The obtainer obtains sensing data output from a sensor that performs sensing of an outside of a mobile body. The detector detects a position of an object outside the mobile body based on the sensing data. The movement predictor predicts a movement of the object based on the sensing data. The costmap generator generates a first costmap based on the position detected of the object and a second costmap based on the movement predicted of the object. The path generator generates a path for the mobile body based on the first costmap. The determination generator generates a movement determination of the mobile body based on the second costmap and the path generated. The controller controls the movement of the mobile body in accordance with the path generated and the movement determination.

According to the above, a first costmap that is based on the detected position of an object and a second costmap that is based on the predicted movement of the object are each generated, and these costmaps are used as appropriate to generate a path for the mobile body and to generate a movement determination of the mobile body. Specifically, the first costmap that does not reflect the movement prediction of the object is used to generate a path for the mobile body, and the second costmap that reflects the movement prediction of the object is used to generate a movement determination of the mobile body. As the first costmap that does not reflect the movement prediction is used to generate a path for the mobile body, a path that fluctuates every moment is less likely to be generated even when the movement prediction is not stable, and the safety and the comfort of the movement of the mobile body can be increased. Meanwhile, as the second costmap that reflects the movement prediction of the object as well as the generated path is used to generate a movement determination of the mobile body, it becomes possible to, for example, stop or decelerate the mobile body in accordance with the movement prediction of a moving object while the mobile body avoids a stationary object or refrains from overly avoiding the moving object. Thus, the safety of the movement of the mobile body can be increased. In this manner, it becomes possible to generate a stable path while allowing the mobile body to stop or decelerate if necessary, with the presupposition that the movement prediction is not stable. Thus, according to this aspect, the safety or the comfort of the movement of the mobile body moving in accordance with a costmap can be improved.

Moreover, the movement determination may include stopping or decelerating the mobile body when a region assigned a cost higher than or equal to a predetermined cost in the second costmap overlaps the path generated.

The case where a region assigned a cost higher than or equal to a predetermined cost in the second costmap overlaps a generated path includes a case where there is a possibility that the mobile body collides with a moving object if the mobile body moves along the generated path. Therefore, the movement determination that causes the mobile body to stop or decelerate is generated in such a case, and thus the safety of the movement of the mobile body can be increased.

Moreover, the path generator may generate the path for the mobile body based further on a part of the second costmap.

For example, when the mobile body moves so as to avoid a moving object, an occupant of the mobile body, being cautious of the moving object, may desire to move while keeping a greater distance than the occupant does when trying to stay away from a stationary object. Therefore, as a part of the second costmap reflecting a movement prediction of the object is used when generating a path for the mobile body, the mobile body, when avoiding a moving object, can move while keeping a greater distance than the mobile body does when trying to stay away from a stationary object.

For example, the part of the second costmap may be determined based on an attribute of the object.

For example, the accuracy of a movement prediction may be low depending on the attribute of an object. For example, a person can suddenly change his or her moving direction. Therefore, when an object is a person, the accuracy of the movement prediction of the person tends to be low. Therefore, for example, when the object has an attribute that tends to lead to a lower accuracy of a movement prediction, an influence of the movement prediction on the path to be generated can be reduced by reducing a part of a second costmap.

For example, the part of the second costmap may be determined based on an attribute of a segment included in a road along the path for the mobile body. For example, the attribute of the segment may include a width of the road. For example, the attribute of the segment may include a width of a sidewalk along the road when the road is a road for mobile bodies. For example, the attribute of the segment may include an intersection along the path for the mobile body. For example, the attribute of the segment may include a type of the road.

For example, when the width of the road along the path for the mobile body, such as a vehicle, is small (for example, the width of a traveling lane is small), the mobile body may have difficulty moving away from a moving object while keeping a greater distance than the mobile body does when trying to stay away from a stationary object. Therefore, for example, when the width of the road along the path for the mobile body is small, a part of the second costmap may be reduced to reduce the influence of the movement prediction on the path to be generated. This can keep the mobile body from going off excessively from the traveling lane when avoiding the moving object. Moreover, for example, at an intersection along the path for the mobile body, the movement of an object or objects in the surroundings of the mobile body may become more complex, and the accuracy of the movement prediction of the object tends to be low. Therefore, for example, when the mobile body is in an intersection, a part of the second costmap may be reduced to reduce the influence of the movement prediction on the path to be generated.

Moreover, the costmap generator may further generate a third costmap based on the attribute of the object detected, and the determination generator may generate the movement determination of the mobile body based further on the third costmap. For example, the determination generator may generate, as the movement determination, a stopping determination of the mobile body based on the path generated and the third costmap.

It is desirable that the movement determination be determined based on an attribute of the object outside the mobile body. For example, there may be a case where it is better to stop the mobile body depending on the attribute of the object outside the mobile body. For example, such a case includes a case where a person is standing still near a crosswalk and trying to walk through the crosswalk. In such a case, since that person is not moving according to the movement determination generated based on the second costmap, the mobile body may not stop. Therefore, as the third costmap is generated based on the attribute of the object (for example, whether the attribute of the object indicates that the object is a person) and as the stopping determination of the mobile body is generated based on the third costmap, the mobile body can be stopped depending on the attribute of the object, and the safety of the movement of the mobile body can be further increased.

The control system may further include a lane predictor that predicts a lane in which the mobile body is planned to move. The costmap generator may further generate a fourth costmap based on the lane predicted, and the determination generator may generate the movement determination of the mobile body based further on the fourth costmap. For example, the determination generator may generate, as the movement determination, a deceleration determination of the mobile body based on the path generated and the fourth costmap.

It is desirable that the movement determination be determined based on the lane in which the mobile body is planned to move. For example, there may be a case where it is better to decelerate the mobile body depending on the lane in which the mobile body is planned to move. For example, when the mobile body, such as a vehicle, is to move over to the adjacent lane, there may be a case where a following vehicle is present behind the vehicle in the lane in which the mobile body is planned to move. In this case, the mobile body may stop according to the movement determination generated based on the second costmap even when, for example, the following vehicle is behind the mobile body with enough clearance for the mobile body to move over to the adjacent lane. Therefore, as the fourth costmap is generated based on the predicted lane and as the deceleration determination is generated based on the fourth costmap, the mobile body can be decelerated and move smoothly to the adjacent lane, and the safety or the comfort of the movement of the mobile body can be further increased.

A control method according to one aspect of the present disclosure is a control method to be executed by a computer, and the control method includes obtaining sensing data output from a sensor that performs sensing of an outside of a mobile body, detecting a position of an object outside the mobile body based on the sensing data, predicting a movement of the object detected, generating a first costmap based on the position detected of the object, generating a second costmap based on the movement predicted of the object, generating a path for the mobile body based on the first costmap, generating a movement determination of the mobile body based on the second costmap and the path generated, and controlling the movement of the mobile body in accordance with the path generated and the movement determination.

This aspect can provide a control method that can improve the safety or the comfort of the movement of the mobile body moving in accordance with a costmap.

Hereinafter, some embodiments will be described in concrete terms with reference to the drawings.

The embodiments described below merely illustrate general or specific examples. The numerical values, the shapes, the materials, the constituent elements, the arrangement positions and the connection modes of the constituent elements, the steps, the order of the steps, and so on illustrated in the following embodiments are examples and are not intended to limit the present disclosure.

Embodiment 1

With reference to FIG. 2 to FIG. 7, Embodiment 1 will be described.

Figure 2:
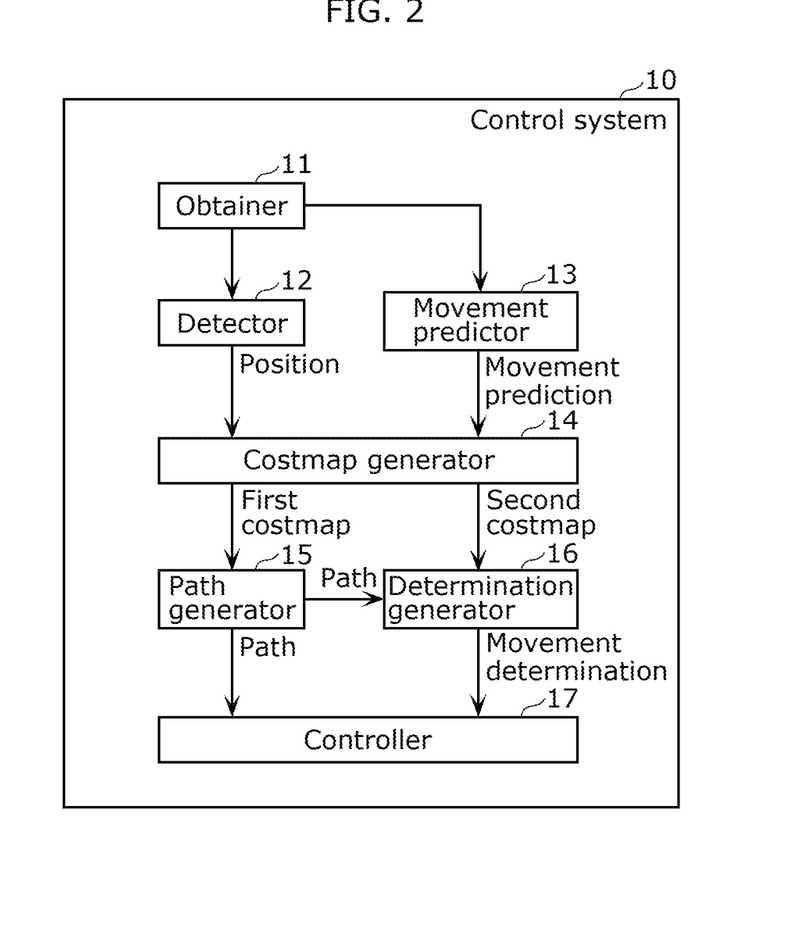
FIG. 2 is a block diagram illustrating an example of a control system according to Embodiment 1.

FIG. 2 is a block diagram illustrating an example of control system 10 according to Embodiment 1.

Control system 10 is a computer for controlling the movement of a mobile body. Control system 10 is, for example, an on-board device to be provided in a mobile body (for example, vehicle 100 or the like). Control system 10 is a computer that includes, for example but not limited to, a processor, a memory, and a communication interface.

The memory is, for example but not limited to, a read only memory (ROM) or a random access memory (RAM) and can store a program or programs to be executed by the processor. Control system 10 includes obtainer 11, detector 12, movement predictor 13, costmap generator 14, path generator 15, determination generator 16, and controller 17. Obtainer 11, detector 12, movement predictor 13, costmap generator 14, path generator 15, determination generator 16, and controller 17 are implemented by, for example but not limited to, the processor that executes the program or programs stored in the memory. In the following description, a vehicle serves as the mobile body, and control system 10 functions as a computer that controls the traveling of the vehicle. In this example, however, the mobile body may be, aside from the vehicle, a flying body such as a drone, a mobile robot, a ship, or the like.

Control system 10 does not have to be provided in the vehicle in this example, and control system 10 may instead be a server connected to and capable of communicating with the vehicle. The constituent elements of control system 10 may be distributed over a plurality of servers.

Obtainer 11 obtains sensing data output from a sensor that performs sensing of the outside of the vehicle. For example, obtainer 11 obtains sensing data output from a sensor provided in, for example but not limited to, the vehicle to be controlled by control system 10, another vehicle in the surroundings of this vehicle to be controlled by control system 10, or a roadside unit in the surroundings of this vehicle to be controlled by control system 10. The sensor is, for example but not limited to, a camera or a Light Detection and Ranging (LiDAR).

Detector 12 detects the position of an object outside the vehicle based on the sensing data obtained by obtainer 11. For example, detector 12 detects the position of the object by analyzing the sensing data by use of a learning model or the like.

Movement predictor 13 predicts the movement of the object outside the vehicle based on the sensing data obtained by obtainer 11. For example, movement predictor 13 predicts the movement of the object (specifically, the direction, the speed, and the like of the movement of the object) based on a change in the position of the object detected through the continuously obtained sensing data. Costmap generator 14 generates a first costmap based on the detected position of the object and generates a second costmap based on the predicted movement of the object. Costmap generator 14 will be described later in detail with reference to FIG. 3 and FIG. 4.

Path generator 15 generates a path for the vehicle based on the first costmap. Path generator 15 will be described later in detail with reference to FIG. 3 and FIG. 5.

Determination generator 16 generates a movement determination of the vehicle based on the second costmap and the generated path. Determination generator 16 will be described later in detail with reference to FIG. 3 and FIG. 6.

Controller 17 controls the movement of the vehicle in accordance with the generated path and the movement determination. For example, controller 17 allows the vehicle to move along the generated path and also stops or decelerates the vehicle in accordance with the movement determination.

Figure 3:
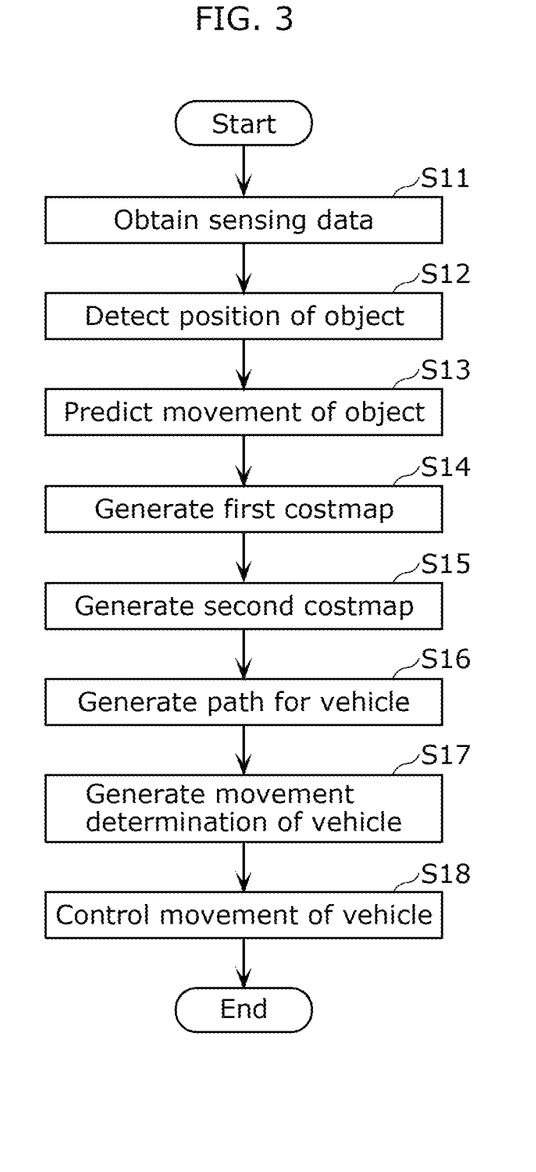
FIG. 3 is a flowchart illustrating an example of an operation of the control system according to Embodiment 1.

FIG. 3 is a flowchart illustrating an example of an operation of control system 10 according to Embodiment 1.

As described above, obtainer 11 obtains sensing data output from a sensor that performs sensing of the outside of the vehicle (step S11). Detector 12 detects the position of an object outside the vehicle based on the sensing data (step S12). Movement predictor 13 predicts the movement of the object outside the vehicle based on the sensing data (step S13).

Next, costmap generator 14 generates a first costmap based on the detected position of the object (step S14). Moreover, costmap generator 14 generates a second costmap based on the predicted movement of the object (step S15). A costmap is a grid map that represents an object, such as an obstacle, as a cost for the purpose of generating an optimal path. For example, a region where an object is present is assigned a high cost, and a path can be generated so as to avoid such a region. Typically, each grid of a costmap is assigned a value that falls within a range defined by an upper limit value and a lower limit value. This, however, is not a limiting example, and each grid may be assigned a binary value. A costmap may also be referred to as a potential map. Now, a first costmap and a second costmap to be generated by costmap generator 14 will be described with reference to FIG. 4.

Figure 4:
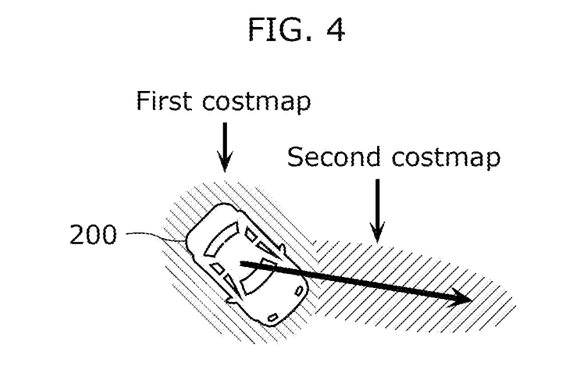
FIG. 4 is a diagram illustrating an example of a first costmap and an example of a second costmap.

FIG. 4 is a diagram illustrating an example of a first costmap and an example of a second costmap. In FIG. 4 and the drawings described hereinafter, vehicle 200 is illustrated as an example of an object outside the vehicle.

A first costmap is generated based on the detected position of an object (for example, vehicle 200). FIG. 4 indicates that the first costmap is generated such that the high cost region is centered around vehicle 200.

A second costmap is generated based on the predicted movement of an object (for example, vehicle 200). For example, vehicle 200 is predicted to curve to the left relative to its traveling direction. FIG. 4 indicates that the second costmap is generated such that the high cost region lies along the direction of the predicted movement of vehicle 200 (for example, the direction indicated by the arrow pointing away from vehicle 200). Moreover, the higher the predicted speed of vehicle 200 is, the farther the high cost region extends in the moving direction of vehicle 200.

Costmap generator 14 generates a first costmap and a second costmap such as those illustrated in FIG. 4. In FIG. 4, each costmap is schematically indicated by a round shape, and the cost is shown to be constant within that round shape. In reality, however, the cost within a costmap is not constant, and the cost decreases from the center of the round shape toward its periphery.

Referring back to FIG. 3, path generator 15 generates a path for the vehicle based on the first costmap (step S16). Now, such a path to be generated based on a first costmap will be described with reference to FIG. 5.

Figure 5:
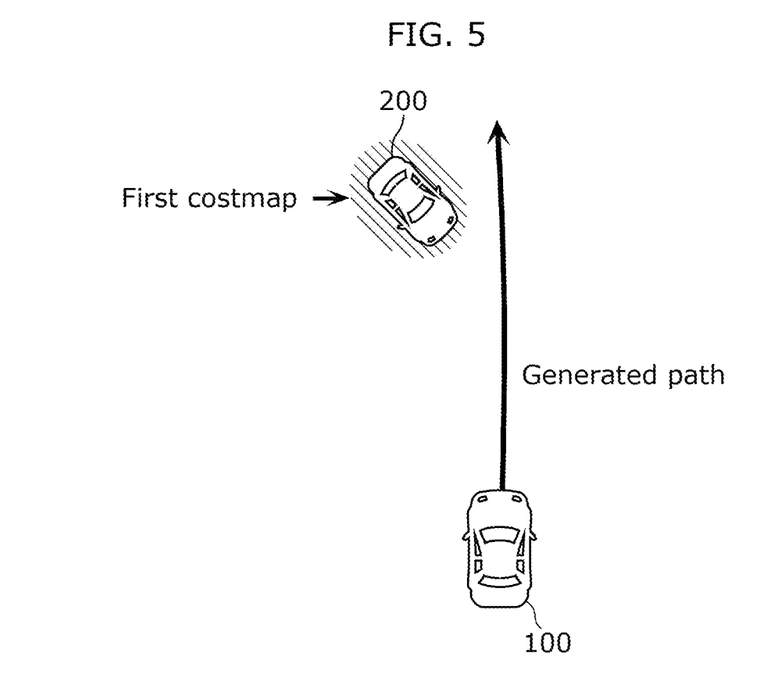
FIG. 5 is a diagram illustrating an example of a path generated based on a first costmap.

FIG. 5 is a diagram illustrating an example of a path generated based on a first costmap. In FIG. 5 and the drawings described hereinafter, vehicle 100 is illustrated as an example of the vehicle controlled by control system 10.

As illustrated in FIG. 5, the high cost region is centered around the position of vehicle 200 in the first costmap, and path generator 15 generates a path so as to avoid this high cost region in the first costmap. When vehicle 100 moves along this path, vehicle 100 and vehicle 200 can collide with each other depending on the movement of vehicle 200. At this point, however, the path for vehicle 100 is generated based on the first costmap that is generated based on the position of vehicle 200 held at a given moment, without the movement prediction of vehicle 200 taken into consideration.

Referring back to FIG. 3, determination generator 16 generates a movement determination of the vehicle based on the second costmap and the generated path (step S17). Now, a movement determination to be generated based on the second costmap and the generated path will be described with reference to FIG. 6.

Figure 6:
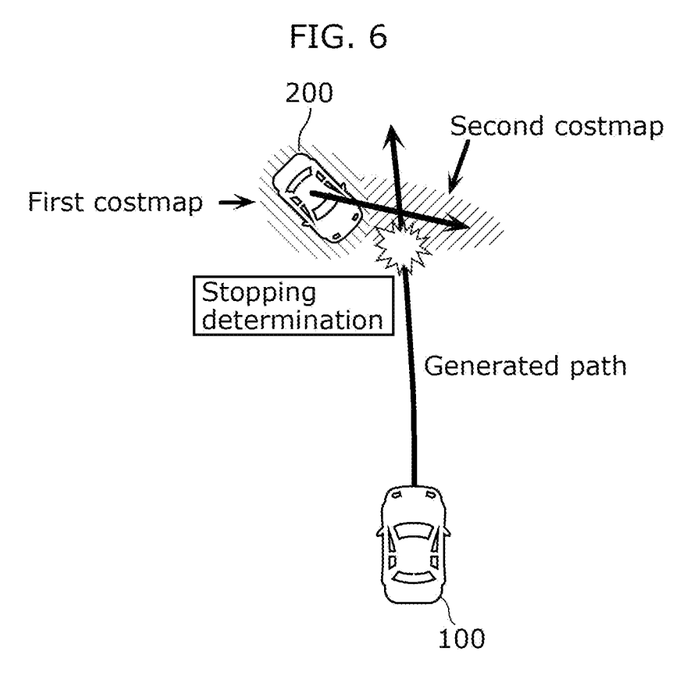
FIG. 6 is a diagram illustrating an example of a movement determination generated based on a second costmap and a generated path.

FIG. 6 is a diagram illustrating an example of a movement determination generated based on a second costmap and a generated path.

As illustrated in FIG. 6, the region assigned a cost higher than or equal to a predetermined cost in the second costmap overlaps the generated path. This predetermined cost is a cost indicating that the probability that an object exists or will exist at that location is high. In other words, vehicle 100 and vehicle 200 may collide with each other if vehicle 100 moves along the generated path. Therefore, the movement determination to be generated by determination generator 16 includes stopping or decelerating vehicle 100 if the region assigned a cost higher than or equal to the predetermined cost in the second costmap overlaps the generated path. This configuration can keep vehicle 100 and vehicle 200 from colliding with each other, and in turn the safety of the traveling of the vehicle can be increased.

In this example, determination generator 16 may generate a movement determination based also on the first costmap, in addition to the second costmap and the generated path. Alternatively, costmap generator 14 may generate a second costmap based also on the detected position of an object, in addition to the predicted movement of the object, and determination generator 16 may generate a movement determination based on this second costmap and the generated path. In other words, a movement determination of the vehicle may be generated in consideration of the position of an object as well.

Referring back to FIG. 3, controller 17 controls the movement of the vehicle in accordance with the generated path and the movement determination (step S18). For example, controller 17 calculates, for example but not limited to, the tire angle or the pedaling depth in accordance with the generated path and the movement determination and notifies the vehicle of the result of the calculation via a controller area network (CAN) or the like. Thus, controller 17 controls the movement of the vehicle.

In this example, path generator 15 may generate a path for the vehicle based also on a part of the second costmap. This will be described with reference to FIG. 7.

Figure 7:
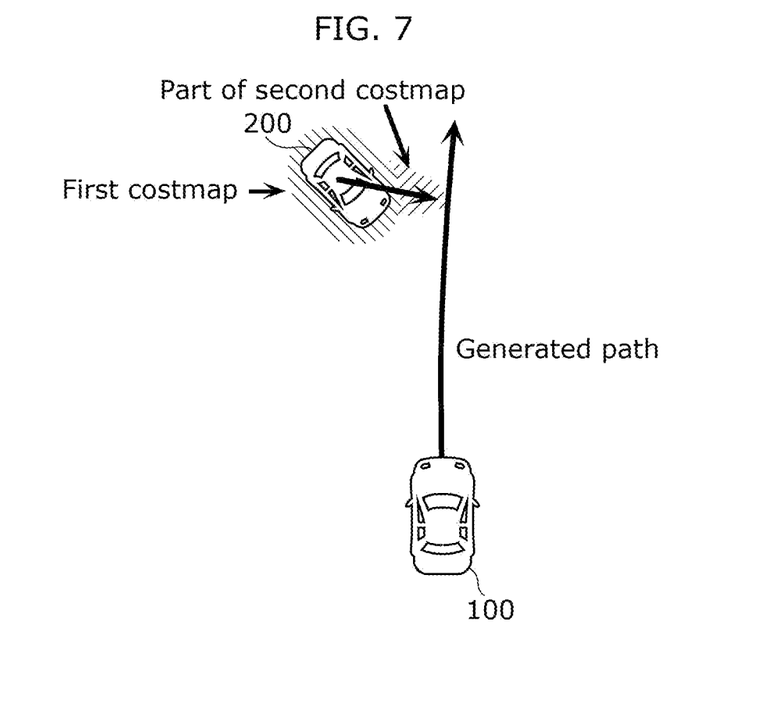
FIG. 7 is a diagram illustrating an example of a path generated based also on a part of a second costmap.

FIG. 7 is a diagram illustrating an example of a path generated based also on a part of a second costmap.

A part of a second costmap is, for example, a part of a high cost region in the second costmap illustrated in FIG. 6 and so on. In this example, a part of a second costmap may be a reduction of the high cost region of the second costmap or the object-side portion of the high cost region that has been cut off from the second costmap.

For example, when vehicle 100 travels so as to avoid moving vehicle 200, an occupant of vehicle 100, being cautious of moving vehicle 200, may desire to travel while keeping a greater distance from vehicle 200 than the occupant does when trying to stay away from a stationary object. Therefore, when a part of the second costmap reflecting the movement prediction of vehicle 200 is used in generating a path for vehicle 100, vehicle 100, trying to avoid vehicle 200, can travel while keeping a greater distance from vehicle 200 than vehicle 100 does when trying to stay away from a stationary object. For example, in the situation illustrated in FIG. 7, a path is generated so as to avoid the first costmap as well as a part of the high cost region in the second costmap, and thus vehicle 100 can travel as far to the right as possible from vehicle 200.

Now, a method of determining a part of a second costmap will be described.

For example, a part of a second costmap is determined in accordance with an attribute of an object outside the vehicle. For example, control system 10 may include a function such as attribute detector 18 described later. Then, control system 10 can, for example, detect an attribute of an object outside the vehicle based on sensing data obtained by a sensor, such as a camera. For example, the accuracy of a movement prediction may be low depending on the attribute of an object. For example, a person can suddenly change his or her moving direction. Therefore, when an object is a person, the accuracy of the movement prediction of the person tends to be low. Therefore, for example, when the object has an attribute that tends to lead to a lower accuracy of a movement prediction, an influence of the movement prediction on the path to be generated can be reduced by reducing a part of a second costmap (in other words, by reducing the area of the high cost region). In this case, an operation that the vehicle performs to avoid the object is suppressed. Meanwhile, for example, when an object has an attribute that tends to lead to a higher accuracy of a movement prediction, an influence of the movement prediction on the path to be generated can be increased by enlarging a part of a second costmap (in other words, by increasing the area of the high cost region). In this case, an operation that the vehicle performs to avoid the object is encouraged.

Alternatively, for example, a part of a second costmap is determined in accordance with an attribute of a segment included in a road along a path for the vehicle. For example, an attribute of a segment may include the width of a road along a path for the vehicle, the width of a sidewalk along such a road, an intersection along a path for the vehicle, or the type of a road. An intersection is a location where two or more roads intersect and is typically, but is not limited to, a crossroad. An intersection may instead be a three-way junction, a roundabout, or the like. A sidewalk may be a sidewalk parallel to a road or a crosswalk traversing a road. An attribute of a segment can be determined based on, for example but not limited to, sensing data obtained by a sensor, such as a camera, or map information. The type of a road may indicate a road of a predefined type such as a roadway or a sidewalk or may indicate a road of a type similar to the predefined type. Specifically, a road of a type similar to the predefined type may be determined based on the type of an object surrounding the vehicle determined based on sensing data or the distance or the like between an object and the vehicle determined based on sensing data. For example, when the density of people in the surroundings of the vehicle is higher than or equal to a threshold, the type of the road may be determined to be a sidewalk (or a pseudo sidewalk). Examples of a pseudo sidewalk include a street in a shopping arcade or a roadway temporarily closed to motor traffic.

For example, when the width of a road along a path for the vehicle is small (for example, the width of a traveling lane is small), the vehicle may have difficulty traveling away from a moving object while keeping a greater distance than that vehicle does when trying to stay away from a stationary object. Therefore, for example, when the width of a road along a path for the vehicle is small, a part of a second costmap may be reduced to reduce the influence of a movement prediction on the path to be generated. In this case, an operation that the vehicle performs to avoid an object is suppressed, and this can keep the vehicle from going over the traveling lane when avoiding the moving object.

Moreover, for example, when the width of a sidewalk along a road along a path for the vehicle is large, the vehicle may enter or get too close to the sidewalk when avoiding a moving object. Therefore, for example, when the width of a sidewalk along a path for the vehicle is large, a part of a second costmap may be reduced to reduce the influence of a movement prediction on the path to be generated. In this case, an operation that the vehicle performs to avoid the object is suppressed, and this can keep the vehicle from entering or getting too close to the sidewalk when avoiding the moving object.

Moreover, for example, at an intersection along a path for the vehicle, the movement of an object or objects in the surroundings of the vehicle may become more complex, and the accuracy of a movement prediction of an object tends to be low. Therefore, for example, when the vehicle is in an intersection, a part of a second costmap may be reduced to reduce the influence of a movement prediction on the path to be generated. In this case, an operation that the vehicle performs to avoid an object is suppressed.

Moreover, for example, when the type of a road along a path for the vehicle is a sidewalk, the density of objects (for example, pedestrians) in the surrounding of the vehicle is high (in other words, the vehicle is close to the objects). Therefore, the vehicle may need to stop frequently. Meanwhile, the moving speed of the vehicle is low in a sidewalk, and thus the risk associated with a collision is lower in a sidewalk than in a roadway. Therefore, for example, when the type of a road is a sidewalk, a part of a second costmap is made larger than when the type of a road is a roadway to increase the influence of a movement prediction on the path to be generated. This configuration can reduce the frequency of stopping of the vehicle, and the vehicle can continue to move while avoiding an object.

Alternatively, a part of a second costmap may be determined in accordance with both an attribute of an object outside the vehicle and an attribute of a segment included in a road along a path for the vehicle.

As described above, according to control system 10, a first costmap that is based on the detected position of an object and a second costmap that is based on the predicted movement of the object are each generated, and these costmaps are used as appropriate to generate a path for the vehicle and to generate a movement determination of the vehicle. Specifically, the first costmap that does not reflect the movement prediction of the object is used to generate a path for the vehicle, and the second costmap that reflects the movement prediction of the object is used to generate a movement determination of the vehicle. As the first costmap that does not reflect the movement prediction is used to generate a path for the vehicle, a path that fluctuates every moment is less likely to be generated even when the movement prediction is not stable, and the safety and the comfort of the traveling of the vehicle can be increased. Meanwhile, as the second costmap that reflects the movement prediction of the object as well as the generated path is used to generate a movement determination of the vehicle, it becomes possible to, for example, stop or decelerate the vehicle in accordance with the movement prediction of a moving object while the vehicle avoids a stationary object or refrains from overly avoiding the moving object. Thus, the safety of the traveling of the vehicle can be increased. In this manner, it becomes possible to generate a stable path while allowing the vehicle to stop or decelerate if necessary, with the presupposition that the movement prediction is not stable. Thus, according to this aspect, the safety or the comfort of the traveling of the vehicle moving in accordance with a costmap can be improved.

Embodiment 2

Next, with reference to FIG. 8, Embodiment 2 will be described.

Figure 8:
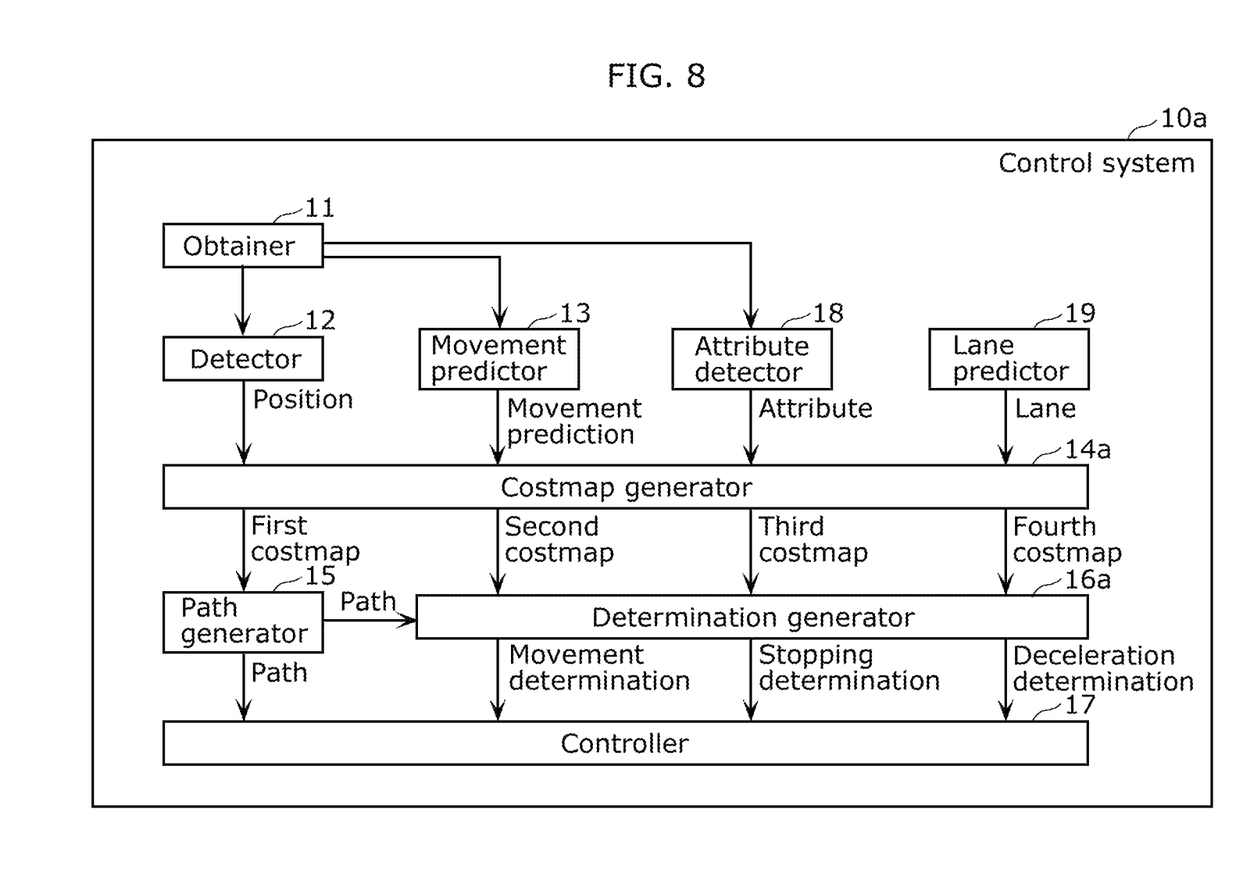
FIG. 8 is a block diagram illustrating an example of a control system according to Embodiment 2.

FIG. 8 is a block diagram illustrating an example of control system 10a according to Embodiment 2. Control system 10a according to Embodiment 2 differs from control system 10 according to Embodiment 1 in that control system 10a further includes attribute detector 18 and lane predictor 19 and includes costmap generator 14a and determination generator 16a in place of costmap generator 14 and determination generator 16, respectively. Features other than the above are the same as those according to Embodiment 1, and thus descriptions thereof will be omitted. In this example, costmap generator 14a, determination generator 16a, attribute detector 18, and lane predictor 19 are implemented by, for example but not limited to, a processor that executes a program or programs stored in a memory.

Attribute detector 18 detects an attribute of an object outside the vehicle based on sensing data of a sensor, such as a camera, obtained by obtainer 11. For example, attribute detector 18 detects an attribute of an object by analyzing the sensing data by use of a learning model or the like. For example, attribute detector 18 determines whether an object is a person, a roadside unit, an automobile, a bicycle, or the like.

Lane predictor 19 predicts a lane in which the vehicle is planned to travel. For example, lane predictor 19 may obtain information indicating a traveling plan of the vehicle from a car navigation system and predict the lane in which the vehicle is planned to travel based on the obtained information. Alternatively, for example, lane predictor 19 may obtain operation information of a direction indicator and predict the lane in which the vehicle is planned to travel based on this operation information.

Costmap generator 14a generates a third costmap based on the detected attribute of an object. For example, when an object is a stationary object, such as a roadside unit, a third costmap is generated such that the region corresponding to the object and its surroundings is assigned a low cost. Meanwhile, for example, when an object is a person, a third costmap is generated such that the region corresponding to the object and its surroundings is assigned a high cost.

Moreover, costmap generator 14a generates a fourth costmap based on the predicted lane. For example, a fourth costmap is generated such that the region corresponding to the lane in which the vehicle is planned to travel is assigned a high cost.

Determination generator 16a generates a movement determination of the vehicle based also on a third costmap. For example, determination generator 16a generates, as a movement determination, a stopping determination of the vehicle based on a generated path and a third costmap. For example, this movement determination includes stopping the vehicle when the region assigned a cost higher than or equal to a predetermined cost in the third costmap overlaps the generated path. For example, there may be a case where it is better to stop the vehicle depending on the attribute of an object outside the vehicle. For example, such a case includes a case where a person is standing still near a crosswalk and trying to walk through the crosswalk. In such a case, since that person is not moving according to the movement determination generated based on a second costmap, the vehicle may not stop. Therefore, as a third costmap is generated based on the attribute of the object (for example, whether the attribute of the object indicates that the object is a person) and as the stopping determination of the vehicle is generated based on the third costmap, the vehicle can be stopped depending on the attribute of the object, and the safety of the traveling of the vehicle can be further increased.

Moreover, determination generator 16a generates a movement determination of the vehicle based also on a fourth costmap. For example, determination generator 16a generates, as a movement determination, a deceleration determination of the vehicle based on a generated path and a fourth costmap. For example, this movement determination includes decelerating the vehicle when the region assigned a cost higher than or equal to a predetermined cost in the fourth costmap overlaps the generated path. For example, there may be a case where it is better to decelerate the vehicle depending on the lane in which the vehicle is planned to travel. For example, when the vehicle is to move over to the adjacent lane, there may be a case where a following vehicle is present behind the vehicle in the lane in which the vehicle is planned to travel. In this case, the vehicle may stop according to the movement determination generated based on a second costmap even when, for example, the following vehicle is behind the vehicle with enough clearance for the vehicle to move over to the adjacent lane. Therefore, as a fourth costmap is generated based on the predicted lane and as the deceleration determination is generated based on the fourth costmap, the vehicle can be decelerated and move smoothly to the adjacent lane, and the safety or the comfort of the traveling of the vehicle can be further increased.

As described above, in addition to a first costmap that is based on the position of an object and a second costmap that is based on the movement of the object, a third costmap that is based on an attribute of the object and a fourth costmap that is based on the lane in which the vehicle is planned to travel are generated, and a movement determination of the vehicle is generated based on the first costmap, the second costmap, the third costmap, and the fourth costmap. Thus, the safety or the comfort of the traveling of the vehicle can be further increased.

OTHER EMBODIMENTS

Thus far, some control systems according to one or more aspects of the present disclosure have been described, but the present disclosure is not limited to these embodiments. Unless departing from the spirit of the present disclosure, an embodiment obtained by making various modifications that a person skilled in the art can conceive of to the foregoing embodiments or an embodiment obtained by combining the constituent elements in different embodiments may also be encompassed by the scope of the one or more aspects of the present disclosure.

For example, in the example described above according to Embodiment 2, costmap generator 14a generates both a third costmap and a fourth costmap. Alternatively, costmap generator 14a does not have to generate a fourth costmap. In this case, control system 10a does not have to include lane predictor 19, and determination generator 16a does not have to generate a movement determination of the vehicle that is based on a fourth costmap. Alternatively, costmap generator 14a does not have to generate a third costmap. In this case, control system 10a does not have to include attribute detector 18, and determination generator 16a does not have to generate a movement determination of the vehicle that is based on a third costmap.

The present disclosure can be implemented not only in the form of a control system but also in the form of a control method that includes the steps (processes) performed by the constituent elements of the control system.

Specifically, the control method is a control method to be executed by a computer, and as illustrated in FIG. 3, the control method includes the processes of obtaining sensing data output from a sensor that performs sensing of the outside of a mobile body (step S11), detecting the position of an object outside the mobile body based on the obtained sensing data (step S12), predicting the movement of the detected object (step S13), generating a first costmap based on the detected position of the object (step S14), generating a second costmap based on the predicted movement of the object (step S15), generating a path for the mobile body based on the first costmap (step S16), generating a movement determination of the mobile body based on the second costmap and the generated path (step S17), and controlling the movement of the mobile body in accordance with the generated path and the movement determination (step S18). In FIG. 3, the mobile body is the vehicle.

For example, the present disclosure can be implemented in the form of a program that causes a processor to execute the steps included in the control method. Furthermore, the present disclosure can be implemented in the form of a non-transitory computer readable recording medium, such as a CD-ROM, that stores such a program.

For example, when the present disclosure is implemented in the form of a program (software), each step is executed as the program is executed by use of hardware resources, such as a central processing unit (CPU), a memory, and an input/output circuit, of a computer. In other words, each step is executed as the CPU retrieves data from the memory, the input/output circuit, or the like and performs an arithmetic operation on the data or as the CPU outputs the outcome of the arithmetic operation to the memory, the input/output circuit, or the like.

In the foregoing embodiments, the constituent elements included in the control system may each be implemented by dedicated hardware or may each be implemented through the execution of a software program suitable for the corresponding constituent element. The constituent elements may each be implemented as a program executing unit, such as a CPU or a processor, reads out a software program recorded in a recording medium, such as a hard disk or a semiconductor memory, and executes the software program.

A part or the whole of the functions of the control system according to the foregoing embodiments may be implemented typically in the form of a large scale integration (LSI), or an integrated circuit. These functions may each be implemented by a single chip, or a part or the whole of these functions may be implemented by a single chip. The circuit integration is not limited to the LSI, and an integrated circuit may be implemented by a dedicated circuit or a general purpose processor. A field programmable gate array (FPGA) that can be programmed after the LSI has been manufactured or a reconfigurable processor in which the connections or the settings of the circuit cells within the LSI can be reconfigured may also be used.

Furthermore, unless departing from the spirit of the present disclosure, various variations obtained by making modifications to the embodiments of the present disclosure within the scope that a person skilled in the art can conceive of are also encompassed by the present disclosure.

INDUSTRIAL APPLICABILITY

The present disclosure can be applied to a system that controls the movement of a mobile body, such as a vehicle.

The invention claimed is:

1. A control system, comprising:
    an obtainer that obtains sensing data output from a sensor that performs sensing of an outside of a mobile body;
    a detector that detects a position of an object outside the mobile body based on the sensing data;
    a movement predictor that predicts a movement of the object based on the sensing data;
    a costmap generator that generates a first costmap that does not reflect the movement of the object based on the position detected of the object and a second costmap based on the movement predicted of the object;
    a path generator that generates a path for the mobile body based on the first costmap;
    a determination generator that generates a movement determination of the mobile body based on the second costmap and the path generated; and
    a controller that controls the movement of the mobile body in accordance with the path generated and the movement determination.

2. The control system according to claim 1, wherein the movement determination includes stopping or decelerating the mobile body when a region assigned a cost higher than or equal to a predetermined cost in the second costmap overlaps the path generated.

3. The control system according to claim 1, wherein the path generator generates the path for the mobile body based further on a part of the second costmap.

4. The control system according to claim 3, wherein the part of the second costmap is determined based on an attribute of the object.

5. The control system according to claim 3, wherein the part of the second costmap is determined based on an attribute of a segment included in a road along the path for the mobile body.

6. The control system according to claim 5, wherein the attribute of the segment includes a width of the road.

7. The control system according to claim 5, wherein the attribute of the segment includes a width of a sidewalk along the road when the road is a road for mobile bodies.

8. The control system according to claim 5, wherein the attribute of the segment includes an intersection along the path for the mobile body.

9. The control system according to claim 5, wherein the attribute of the segment includes a type of the road.

10. The control system according to claim 1, wherein the costmap generator further generates a third costmap based on an attribute of the object detected, and the determination generator generates the movement determination of the mobile body based further on the third costmap.

11. The control system according to claim 10, wherein the determination generator generates, as the movement determination, a stopping determination of the mobile body based on the path generated and the third costmap.

12. The control system according to claim 1, further comprising:
    a lane predictor that predicts a lane in which the mobile body is planned to move, wherein
    the costmap generator further generates a fourth costmap based on the lane predicted, and
    the determination generator generates the movement determination of the mobile body based further on the fourth costmap.

13. The control system according to claim 12, wherein the determination generator generates, as the movement determination, a deceleration determination of the mobile body based on the path generated and the fourth costmap.

14. A control method to be executed by a computer, the control method comprising:
    obtaining sensing data output from a sensor that performs sensing of an outside of a mobile body;
    detecting a position of an object outside the mobile body based on the sensing data;
    predicting a movement of the object detected;
    generating a first costmap that does not reflect the movement of the object based on the position detected of the object;
    generating a second costmap based on the movement predicted of the object;
    generating a path for the mobile body based on the first costmap;
    generating a movement determination of the mobile body based on the second costmap and the path generated; and
    controlling the movement of the mobile body in accordance with the path generated and the movement determination.

* * * * *